(12) United States Patent
Hutchison et al.

(10) Patent No.: US 9,239,340 B2
(45) Date of Patent: Jan. 19, 2016

(54) OPTOMECHANICAL SENSOR FOR ACCELEROMETRY AND GYROSCOPY

(71) Applicant: Intel Corporation, Santa Clara, CA (US)

(72) Inventors: David N. Hutchison, Santa Clara, CA (US); John Heck, Berkeley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 5 days.

(21) Appl. No.: 14/106,245

(22) Filed: Dec. 13, 2013

(65) Prior Publication Data

US 2015/0168441 A1    Jun. 18, 2015

(51) Int. Cl.
*G01C 19/72*    (2006.01)
*G01P 15/093*   (2006.01)
*G01P 15/14*    (2013.01)

(52) U.S. Cl.
CPC .............. *G01P 15/093* (2013.01); *G01P 15/14* (2013.01)

(58) Field of Classification Search
CPC ........ G01C 19/00; G01C 19/16; G01C 19/02; G01C 19/04; G01C 19/06
USPC ........................................................ 356/461
See application file for complete search history.

(56) References Cited

U.S. PATENT DOCUMENTS 4,479,385 A * 10/1984 Koehler ..................... 73/514.29
4,900,918 A     2/1990 Killian

| | | |
|---|---|---|
| 5,367,584 A | 11/1994 | Ghezzo et al. |
| 5,926,591 A | 7/1999 | Labeye et al. |
| 6,032,531 A * | 3/2000 | Roszhart ..................... 73/504.04 |
| 6,856,712 B2 | 2/2005 | Fauver et al. |
| 2002/0180978 A1 | 12/2002 | Berg et al. |
| 2003/0200803 A1 | 10/2003 | Platt |
| 2003/0206693 A1 | 11/2003 | Haig et al. |

(Continued)

FOREIGN PATENT DOCUMENTS

CN    1743850 A    3/2006
CN    101960252 A  1/2011

(Continued)

OTHER PUBLICATIONS

I. De Vlaminck et al., "Detection of nanomechanical motion by evanescent light wave coupling" Applied Physics Letters 90, 233116, 2007, 3 pages.

(Continued)

*Primary Examiner* — Jonathan Hansen
(74) *Attorney, Agent, or Firm* — Schwabe Williamson & Wyatt PC (57) ABSTRACT

Embodiments of the present disclosure are directed towards techniques and configurations for a MEMS device configured to determine inertial change applied to the device. In one instance, the device may comprise a laser arrangement configured to generate a light beam having a resonant wavelength, a waveguide configured to receive and output the light beam, and an optical resonator comprising a deformable closed loop and optically coupled to the waveguide to receive a portion of the light beam. A deformation of the optical resonator may result in a change of an optical path length of a portion of the light beam traveling through the optical resonator, causing a change in the resonant wavelength of the light beam outputted by the waveguide. Other embodiments may be described and/or claimed.

17 Claims, 8 Drawing Sheets

(56) References Cited

U.S. PATENT DOCUMENTS

| | | | |
|---|---|---|---|
| 2004/0156580 | A1 | 8/2004 | Baumann et al. |
| 2005/0025419 | A1 | 2/2005 | Fish et al. |
| 2005/0160816 | A1 | 7/2005 | Yu |
| 2005/0268717 | A1 | 12/2005 | Ozawa |
| 2006/0072875 | A1 | 4/2006 | Bhagavatula et al. |
| 2006/0169044 | A1 | 8/2006 | Hodgins et al. |
| 2006/0192974 | A1 | 8/2006 | Li |
| 2006/0198567 | A1 | 9/2006 | Levy et al. |
| 2006/0279862 | A1 | 12/2006 | Elata et al. |
| 2010/0238454 | A1 | 9/2010 | Pruessner et al. |
| 2010/0290060 | A1 | 11/2010 | Mohazzab et al. |
| 2011/0044577 | A1* | 2/2011 | Gupta .................. G01L 1/243 385/13 |
| 2011/0179870 | A1 | 7/2011 | Chan et al. |
| 2011/0303008 | A1 | 12/2011 | Zhang et al. |
| 2013/0330232 | A1 | 12/2013 | Pruessner et al. |
| 2014/0047585 | A1* | 2/2014 | Hofrichter et al. ............. 850/56 |
| 2014/0283601 | A1* | 9/2014 | Bhave et al. ............... 73/504.12 |

FOREIGN PATENT DOCUMENTS

| | | | |
|---|---|---|---|
| EP | 1083429 | A2 | 3/2001 |
| GB | 2493585 | A | 2/2013 |
| JP | 2002250885 | A | 9/2002 |
| JP | 2006064977 | A | 3/2006 |
| KR | 1020030080637 | A | 10/2003 |
| TW | I265277 | B | 11/2006 |
| WO | 2013052953 | A1 | 4/2013 |

OTHER PUBLICATIONS

Eric Ollier, "Optical MEMS Devices Based on Moving Waveguides", IEEE Journal on Selected Topics in Quantum Electronics, vol. 8, No. 1, Jan./Feb. 2002, 8 pages.

Marcel W. Pruessner et al., "End-Coupled Optical Waveguide MEMS Devices in the Indium Phosphide Material System", J. Micromech. Microeng. 16, pp. 832-842, 2006, 11 pages.

Kirill Zinoviev et al., "A Novel Optical Waveguide Microcantilever Sensor for the Detection of Nanomechanical Forces", Journal of Lightwave Technology, vol. 24, No. 5, May 2006, 7 pages.

M. Li et al.,"Broadband All-Photonic Transduction of Nanocantilevers", Nat.Nanotechnol.4,377, 2009, 3 pages.

G. Anetsberger et al., "Near-Field Cavity Optomechanics with Nanomechanical Oscillators", Nature Physics, vol. 5, pp. 909-914, Dec. 2009, 6 pages.

Mounier et al., "Status of the MEMS Industry" Yole Dëveloppement, Jul. 2012, 3 pages.

T.J. Kippenberg et al., "Cavity Opto—Mechanics", Optical Society of America, 2007, 34 pages.

D.N. Hutchison et al., "Z-Axis Optomechanical Accelerometer", IEEE pp. 615-619, 2012, 5 pages.

A. G. Krause et al., "A high-resolution microchip optomechanical accelerometer," Nature Photonics 6, pp. 768-772, 2012, 2 pages.

B. E. Little et al., "Microring resonator channel dropping filters," Lightwave Technology Journal of, vol. 15, No. 6, pp. 998-1005, 1997, 9 pages.

International Search Report for PCT Application No. PCT/US2014/066702, dated Mar. 6, 2015, 14 pages.

International Search Report for PCT Application No. PCT/US2014/066464, dated Feb. 26, 2015, 14 pages.

International Search Report for PCT Application No. PCT/US2014/066463, dated Mar. 6, 2015, 13 pages.

International Search Report for PCT Application No. PCT/US2014/066462, dated Mar. 17, 2015, 13 pages.

Taiwan Office Action for TW Application No. 103138911, dated Jul. 6, 2015, 14 pages.

Taiwan Office Action for TW Application No. 103139067, dated Jul. 21, 2015, 14 pages.

Taiwan Office Action for TW Application No. 103139069, dated Jul. 21, 2015, 16 pages.

Non-Final Office Action mailed Sep. 25, 2015, issued in related U.S. Appl. No. 14/106,172, filed Dec. 13, 2013, 29 pages.

Office Action and Search Report mailed Oct. 2, 2015, in corresponding Taiwan Patent Application No. 103139210, 16 pages.

Hutchison, D.N., et al., "Z-Axis Optomechanical Accelerometer," IEEE, MEMS 2012, Paris, France, Jan. 29-Feb. 2, 2012, pp. 615-619.

* cited by examiner

OPTOMECHANICAL SENSOR FOR ACCELEROMETRY AND GYROSCOPY

FIELD

Embodiments of the present disclosure generally relate to the field of opto-electronics, and more particularly, to using micro-electronic systems (MEMS) for accelerometry and gyroscopy.

BACKGROUND

The market demands and revenues for displacement-sensing devices, such as accelerometers including micro-electronic systems (MEMS)-based sensors have been growing steadily. The integration of inertial MEMS sensors into a wide range of consumer electronics, cars, and defense applications is driving the need for smaller, cheaper, lower-power, lower-noise, and more accurate sensors. Technologies for producing micro-scale accelerometers and similar sensing devices have remained essentially unchanged since their inception years ago. A typical sensor in an accelerometer may include a movable proof-mass with the proof-mass displacement sensed electrically, e.g., using inter-digitated capacitor plates. However, traditional electrostatic sensing may not allow for scalable production of on-chip sensors, lasers, and detectors, and may not provide sufficient sensitivity or desired sensitivity range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for providing example MEMS sensing devices for sensing inertial change. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first layer formed, deposited, or otherwise disposed on a second layer," may mean that the first layer is formed, deposited, or disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
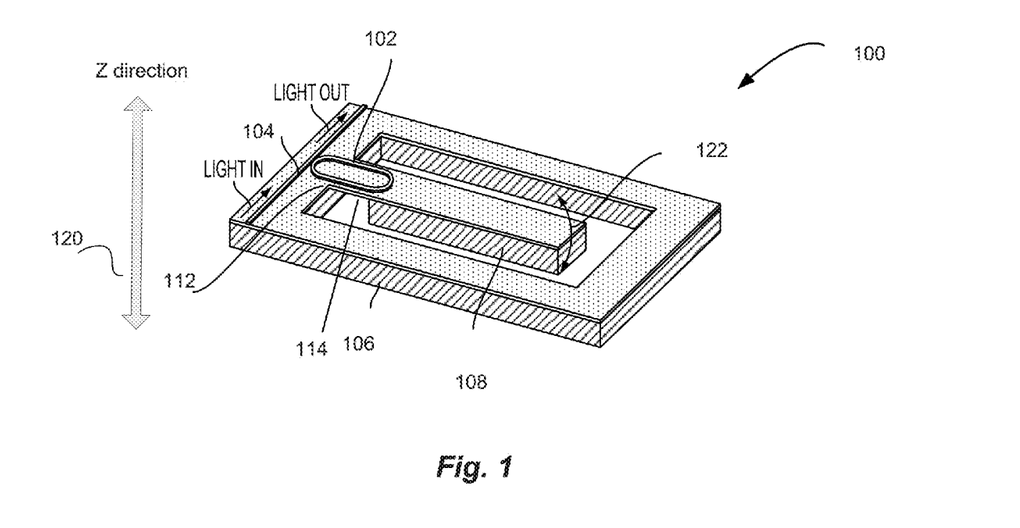
FIGS. 1 and 2 are diagrams schematically illustrating an example MEMS sensing devices for sensing inertial change, in accordance with some embodiments.

FIG. 1 is a diagram schematically illustrating an example MEMS sensing device 100 for sensing inertial change, in accordance with some embodiments. The device 100 may include a deformable optical resonator 102 comprising a closed loop optically coupled to a waveguide 104 to receive a portion of a light beam provided by a light source, e.g., a laser (not shown). The optical resonator 102 may be disposed on a frame 106 and on a proof mass 108, as shown. The proof mass may be attached to the frame in different ways. For example, the proof mass 108 may be cantilevered to the frame 106 with a cantilever 114 as shown in FIG. 1. In other embodiments, the proof mass 108 may be attached to the frame 106 with one or more spring arrangements, as will be discussed in greater detail in reference to FIGS. 9-11.

In the embodiment illustrated in FIG. 1, the optical resonator 102 may be disposed on the frame 106 extending over a clamped point 112 of the cantilever 114 onto the proof mass 108.

If an external acceleration is applied to the device 100, e.g., in direction z perpendicular to the plane of the frame 106 (as indicated by an arrow 120), the proof mass 108 my bend up or down due to z-acceleration, stretching the optical resonator 102. Accordingly, optical path length around the optical resonator 102 may change, causing a corresponding change of the resonant frequency of the optical resonator 102. The change of resonant frequency results in a change in intensity of the transmitted light. Thus external acceleration may be determined by tracking a change in the resonant frequency of the optical transmission of light via the waveguide 104.

Figure 2:
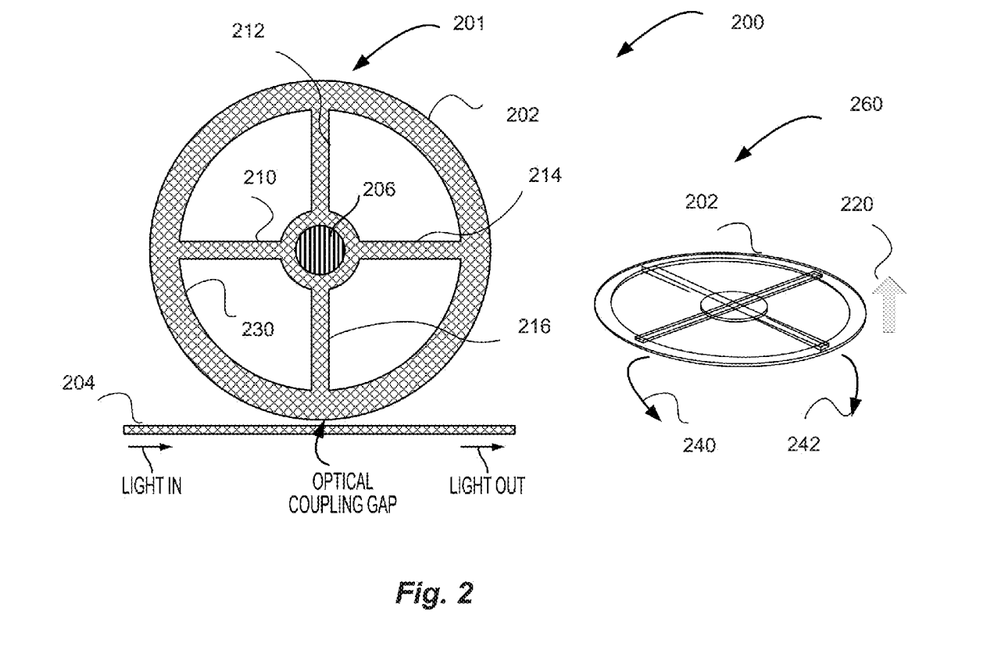

FIG. 2 is a diagram schematically illustrating another example MEMS sensing device 200 for sensing inertial change, in accordance with some embodiments. The device 200 may include a deformable optical resonator 201 comprising a ring 202 optically coupled to a waveguide 204 to receive a portion of a light beam provided by a light source, e.g., a laser (not shown). The ring 202 may include an axle 206 disposed at a center of the ring 202 and at least one spoke 210 coupling the axle 206 and a rim 230 of the ring 202. In the embodiment illustrated in FIG. 2, the ring 202 includes four spokes 210, 212, 214, and 216, by way of example only. It will be appreciated that different numbers of spokes may be used, depending on the desired flexibility properties of the ring 202.

In some embodiments, the ring 202 may be clamped in the center to the axle 206, while the rim 230 of the ring 202 may be deformable radially. The light may be sent into the optical resonator 201 via the waveguide 204, as shown in FIG. 2. When the input light wavelength times an integer equals the optical path length around the ring 202, the light frequency may be resonant.

Similar to the embodiment described in reference to FIG. 1, the device 200 may be a subject to an external acceleration, e.g., z-acceleration, where z is the axis running through the center of the ring 202, perpendicular to the plane of the ring 202. For explanation purposes, a perspective view 260 of the ring 202 is shown in FIG. 2. The applied z-acceleration in a direction indicated by arrow 220 may deform the ring 202. More specifically, the ring may deform in z direction as well, but due to the nature of the spokes 210, 212, 214, and 216 pulling inwards on the downwards-moving rim 230 of the ring 202, some rim 230 deformation in the radial direction (indicated by arrows 240 and 242) may also occur. The radial deformation 240, 242 of the ring 202 may change the optical path length around the ring 202. Similar to the embodiment described in reference to FIG. 1, a change in optical path length around the ring 202 may shift the resonant frequency of the light passing through the optical resonator 201, thus changing the optical power transmitted through the waveguide 204. This change in output optical power may allow for detection and determination of an external acceleration applied to the sensing device 200.

Figure 3:
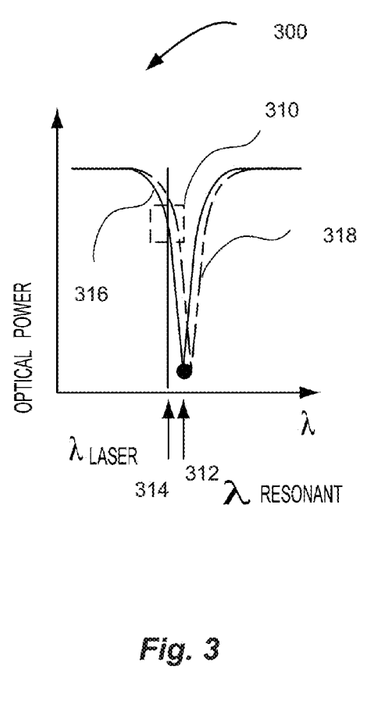
FIG. 3 is an example graph illustrating a light signal power output as a function of light signal wavelength of the MEMS sensing devices of FIGS. 1 and 2, in accordance with some embodiments.
Figure 4:
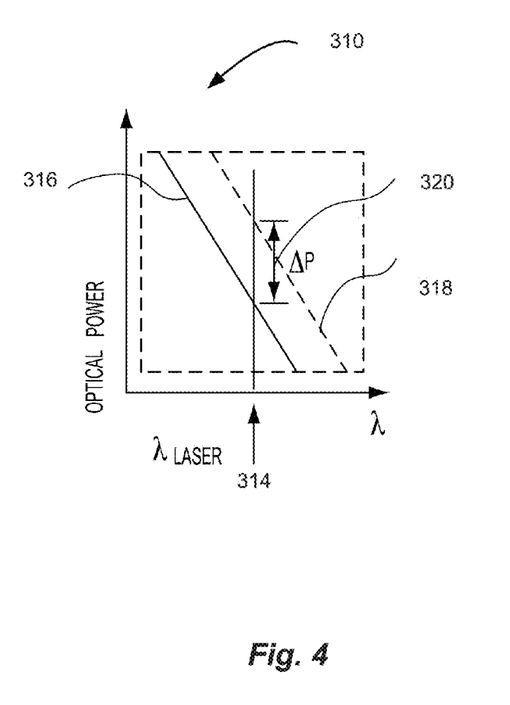
FIG. 4 is an enlarged view of a portion of the graph of FIG. 3 indicated by a dashed line.

FIG. 3 is an example graph 300 illustrating a light signal power output as a function of light signal wavelength of the MEMS sensing devices 100 or 200, in accordance with some embodiments. FIG. 4 is an enlarged view of a portion 310 of the graph 300 indicated by a dashed line. The light signal power corresponds to light intensity and will be used hereinafter interchangeably with light intensity. As graphs 300 and 310 illustrate, when the input light signal wavelength equals the optical path length around the resonator 102 or 202, the light signal becomes resonant, as shown by the "dip" 312 in graph 300. If a light beam source (e.g., a laser) is biased onto the side of the optical resonance, i.e., if the input light wavelength 314 is calibrated to be on a side of the curve 316 as shown in FIG. 3, the resonant frequency 312 may shift with the curve 316 shifting to a position 318. The optical power transmitted through the waveguide 104 (204) may change accordingly, as indicated by numeral 320 in FIG. 4. This change in output optical power (light intensity) may be detectable, and the external acceleration applied to the device 100 (200) may be determined based on the detected change in the output optical power (light intensity).

Figure 5:
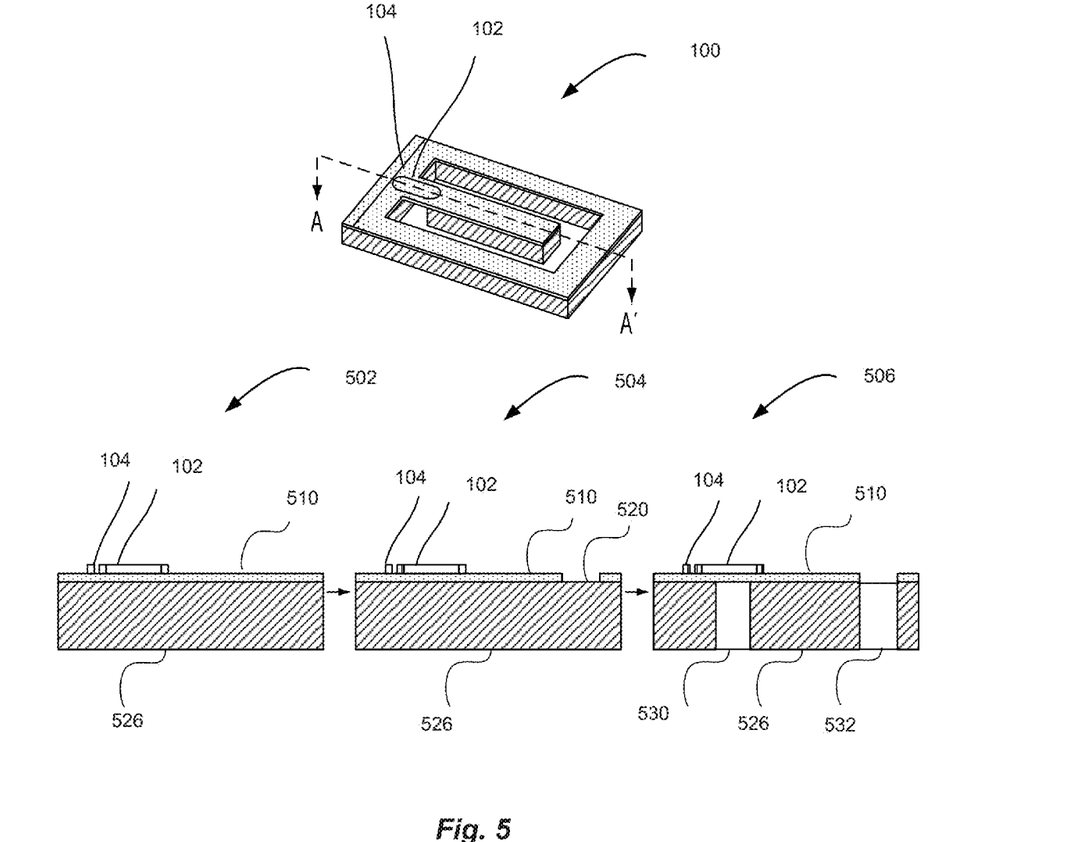
FIG. 5 schematically illustrates a perspective view and cross-sectional views of the example sensing device of FIG. 1 at various stages of manufacturing of the device, in accordance with some embodiments.

FIGS. 5-12 are diagrams schematically illustrating various embodiments of sensing devices 100 and 200 described in reference to FIGS. 1 and 2 and methods of their fabrication. FIG. 5 illustrates a perspective view of the example sensing device 100 with a cross-section AA' as shown by the dashed line. Cross-sectional views 502, 504, and 506 along the line AA' illustrate the device 100 at various stages of manufacturing of the device. At the fabrication stage illustrated by 502, the waveguide 104 and resonator 102 may be formed in the top silicon (Si) layer 510 of a silicon on insulator (SOI) wafer 526 comprising the frame 106. At the fabrication stage illustrated by 504, the layer 510 may be etched in the shape of the cantilever 114 as shown by opening 520. At the fabrication stage illustrated by 506, the proof mass 108 may be cut from the back side of the wafer 526 as shown by openings 530, 532, for example, using Deep Reactive Ion Etching (DRIE). The design of the device 100 described in reference to FIG. 5 may be advantageous in decoupling the mechanics of manufacturing the cantilever and proof mass out of the wafer from the sensing mechanism comprised by the optical resonator. Accordingly, a proof mass of a desired dimensions and weight may be attached to the device without needing to modify the resonator geometry.

Figure 6:
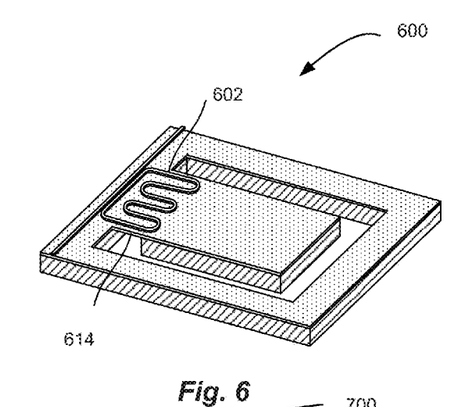
FIGS. 6-10 schematically illustrate various examples of a sensing device similar to one of FIG. 1, in accordance with some embodiments.

FIG. 6 illustrates an example embodiment of a sensing device 600 similar to an embodiment of the device 100 discussed above. More specifically, FIG. 6 illustrates an example sensing device 600 having an optical resonator 602 shaped approximately as a serpentine structure, as shown. The optical resonator 600 shaped as shown in FIG. 6 may be disposed on the device 600 so as to make multiple passes across the region of strain of a cantilever 614, when the cantilever is strained by an external acceleration applied to the device 600. Such configuration of the optical resonator may allow for increased sensitivity of the resonator.

Figure 7:
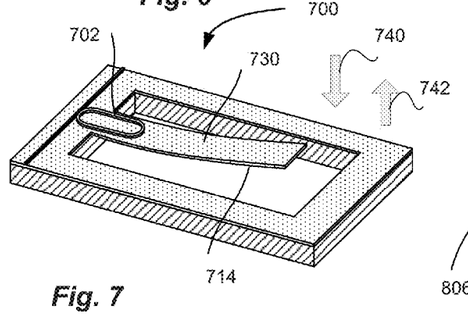

When a cantilever of the device 100 is bent, a line or plane of zero stress may run through the cantilever. If the cantilever is bent upwards (i.e., up and out of plane of the device 600 or 700), there may be compressive stress on the top half of the cantilever, tensile stress on the bottom half of the cantilever, and a line of zero stress in the middle of the cantilever.

Depending on a number of factors including fabrication, it is conceivable that the line of zero stress may run through the optical resonator. In that case, it may be difficult to distinguish the direction of acceleration using the device 100, because upwards and downwards accelerations may cause lengthening of the optical resonator. In some embodiments, the direction of acceleration may be determined using another sensing device (either optomechanical or otherwise), wherein the measurements provided by both sensing devices may be merged to obtain magnitude and direction of acceleration.

In some embodiments, the cantilever of a sensing device, such as a cantilever 714 of a device 700 (similar to device 100) shown in FIG. 7 may be configured to include a "pre-curl" 730 to ensure that applied acceleration in one direction (e.g., z-acceleration indicated by arrow 740) lengthens the optical resonator 702 path length, while the acceleration in the other direction (e.g., z-acceleration indicated by arrow 742) compresses (shortens) the optical resonator 702 path length. Accordingly, introducing a material-stress-induced "pre-curl" 730 into the cantilever 714 may break the symmetry of an optical path length change and differentiate +z-acceleration from −z-acceleration if necessary. In some embodiments, the "pre-curl" 730 may be induced with a stress gradient normal to the surface of the device 700.

Figure 8:
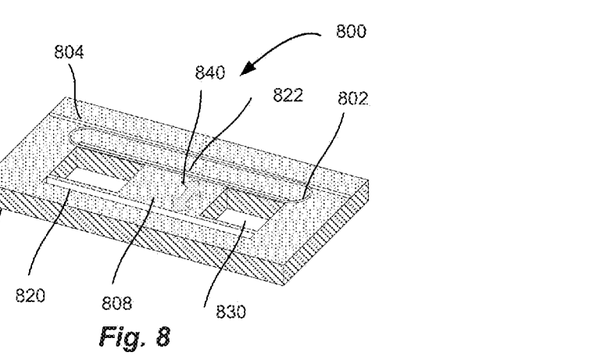
Figure 9:
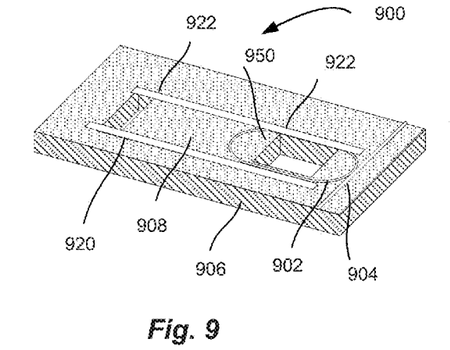
Figure 10:
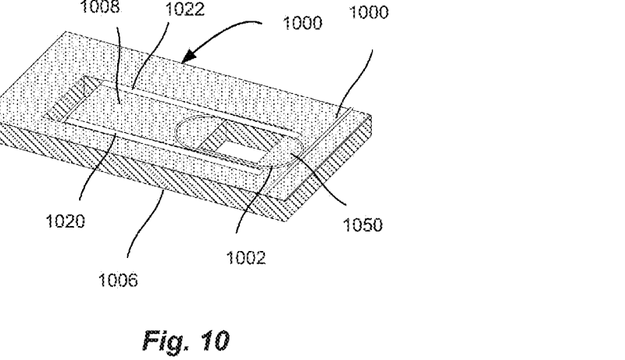

Note that a proof mass may be attached to a frame of a sensing device such as device 100, 600, or 700 by way of a cantilever, as described in reference to FIGS. 1, 6, and 7. In other embodiments, the proof mass may be movably affixed to the frame of the sensing device in a number of different ways, providing for changing the optical path length of an optical resonator similar to the embodiments described in reference to FIGS. 1-7. Also, the optical resonator may be disposed on a sensing device in different ways. FIGS. 8-10 illustrate various configurations of a sensing device in accordance with some embodiments.

FIG. 8 illustrates an example sensing device 800, in which a proof mass 808 is movably affixed to a frame 806 with one or more (in this embodiments, two) spring arrangements 820, 822. More specifically, the spring arrangements 820, 822 may be configured to affix the proof mass 808 to the frame 806 at both ends of an opening 830 of the frame 806. The proof mass 808 disposed within the frame 806 as shown may be movable, in response to an external acceleration, in plane with the frame 806 of the device 800, in directions indicated by an arrow 840. Note that an optical resonator 802 is disposed on a side of the frame 806 and is attached to the proof mass 808 around a center of its upper part, as shown. Similar to the embodiments discussed above, when the proof mass 808 moves in the direction 840 in response to an external acceleration applied in plane with the device 800 (i.e., also in the direction indicated by 840), the optical path length of the optical resonator 802 may change, causing a corresponding change of the resonant frequency and corresponding detectable change of a light power (intensity) transmitted by a waveguide 804.

FIG. 9 illustrates an example sensing device 900, configured similarly to the device 800, wherein an optical resonator 902 is disposed in part on a side 950 of a proof mass 908 movably affixed to a frame 906 with spring arrangements 920 and 922, similar to the example sensing device 800. Similarly to the device 800, moving the proof mass 908 in plane with the device 900 may change the optical path length of the optical resonator 902, causing a corresponding change of the resonant frequency and corresponding detectable change of a light power (intensity) transmitted by a waveguide 904.

FIG. 10 illustrates an example sensing device 1000, configured similarly to the device 800, wherein an optical resonator 1002 is also disposed in part on a side of a proof mass 1008 movably affixed to a frame 906 with spring arrangements 1020 and 1022. Note that the spring arrangements 1020 and 1022 are affixed to the frame 1006 at an end 1050 of the frame 1006, providing for a movability of the proof mass out of plane of the frame 1006, similar to the embodiments of sensing devices with cantilevers described in reference to FIGS. 1, 6, and 7. Similarly, an external z-acceleration (i.e., acceleration applied perpendicular to the plane of the frame 1006) may move the proof mass 1008 out of plane of the device 1000, changing the optical path length of the optical resonator 1002, causing a change of the resonant frequency and corresponding detectable change of a light power (intensity) transmitted by a waveguide 1004.

Note that such embodiments as shown in FIGS. 8-10 the spring arrangements (legs) need not have substantially straight shapes. The legs may have one or more bends with sufficient radius of curvature around the bends so to not induce significant optical losses in the waveguide that may run substantially along the legs.

Figure 11:
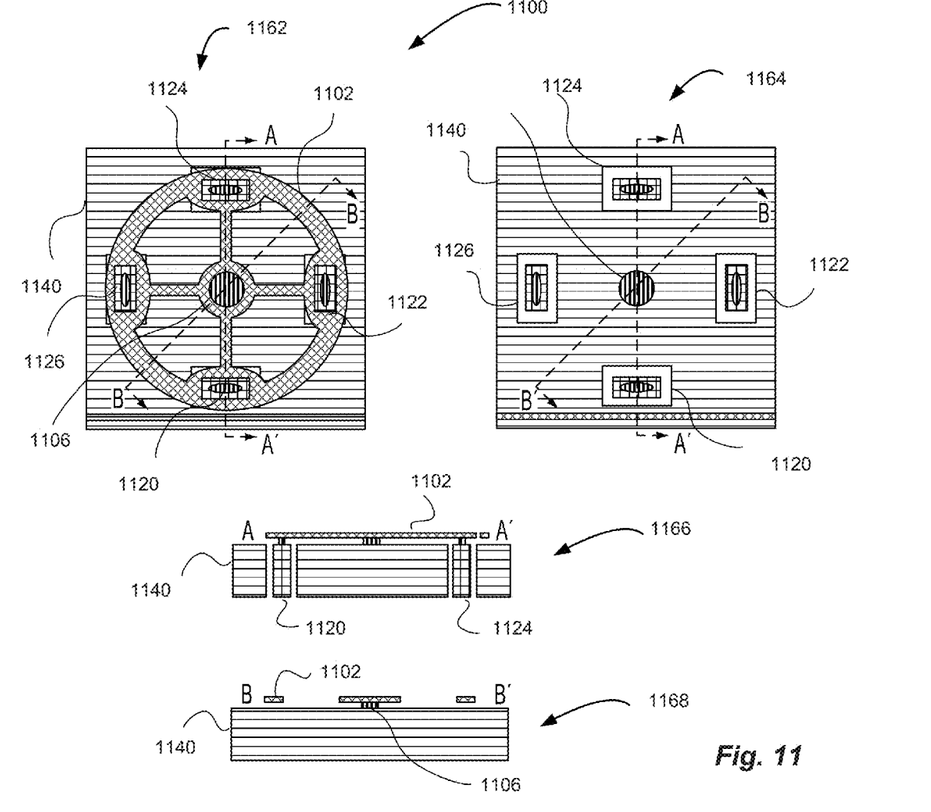
FIGS. 11-12 schematically illustrate various views of a sensing device similar to the device of FIG. 2 and including additional proof masses attached to the optical resonator, in accordance with some embodiments.
Figure 12:
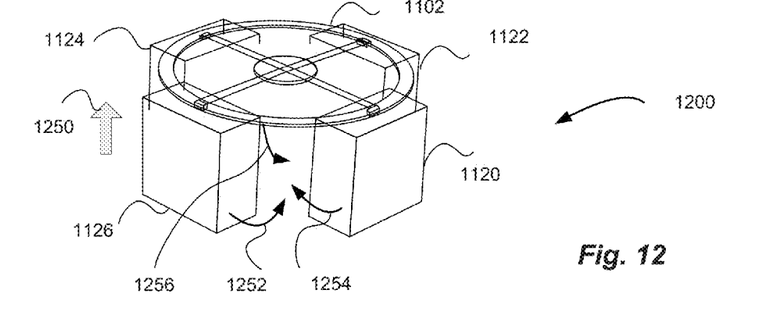

Referring back to the sensing device 200 described in reference to FIG. 2, namely, a sensing device with a deformable optical resonator having a ring-like shape, note that a ring (e.g., 202) may have small mass compared with a typical MEMS accelerometer. Mass determines a level of noise in a sensing device such as device 200. If a lower noise is desired in the device 200, one or more proof masses may be attached to the ring 202 in a variety of configurations, while preserving the desired ring flexibility, so that ring radius may change in response to z-acceleration as described in reference to FIG. 2. FIGS. 11-12 illustrate various embodiments of a sending device similar to the device 200 that may include one or more proof masses attached to a ring-shaped resonator similar to 201.

FIG. 11 illustrates various views 1162, 1164, 1166, and 1168 of an embodiment of a sensing device 1100 similar to the device 200 and including additional proof masses attached to the optical ring. A top view 1162 of the sensing device 1100 includes an optical plane of a ring 1102, an axle 1106 (e.g., manufactured in buried oxide) formed on a frame 1140 that may comprise a silicon (Si) wafer, one or more proof masses 1120, 1122, 1124, and 1126 that may also be manufactured in Si, in some embodiments. Another top view 1164 of the sensing device 1100 illustrates a view similar to 1162, with the ring 1102 removed for clarity. Views 1166 and 1168 illustrate cross-sections AA' and BB' of the sensing device 1100.

In some embodiments, the proof masses may be formed, for example, by deep etching the underlying Si. In some embodiments, the proof masses 1120, 1122, 1124, and 1126 may be provided to be orders of magnitude larger mass than the ring 1102. Note that the proof masses 1120, 1122, 1124, and 1126 may be provided in a form of a cuboid, as shown in FIG. 11. The cuboid shape of the proof masses may be advantageous because other shapes, for example a proof mass in the shape of a ring similar to ring 1102 may cause the optical ring to be too stiff and hence not deform in radial direction as desired. Accordingly, the proof masses 1120, 1122, 1124, and 1126 may be attached to the ring 1102 in separate spots (e.g., where the spokes 1110 meet the ring 1102 as shown in 1160), allowing for flexibility in the ring 1102.

FIG. 12 illustrates a simulation 1200 of the deformation of the ring 1102 with the proof masses 1120, 1122, 1124, and 1126 of the sensing device 1100. For simplicity, the frame 1140 is not shown, only the ring 1102 and four proof masses 1120, 1122, 1124, and 1126 are illustrated. When z-acceleration is applied to the device 1100 in a direction indicated by arrow 1250, the proof masses may move toward the center of the structure formed by 1102, 1120, 1122, 1124, and 1126 (e.g., in a direction indicated by arrows 1252 and 1254), thus causing the ring 1102 to deform in a radial direction indicated by arrow 1256. A degree of deformation of the ring 1102 may depend on proof mass 1120, 1122, 1124, and 1126 size and configuration. The external acceleration may be calculated based on the degree of deformation, i.e., displacement of the resonant ring of the sensing device 1100. The power of the light signal may vary with acceleration according to the following formula:

$$\frac{dP}{da} = \xi \frac{Q_0}{\omega_0} P_0 \frac{d\omega_0 dr dz}{dr dz da} \qquad \text{Equation 1}$$

where P is transmitted optical power, a is acceleration, $Q_o$ $Q_0$ is optical quality factor, $\xi$ is a constant, and $dw_0/dr$ is how the resonant frequency of the device changes with radius of the resonator ring. For the device 100, the formula may be the same, except instead of writing in terms of radius r, it may be more convenient to write it in terms of the circumferential length L.

At least some of the embodiments described above may have not only accelerometry, but also gyroscopy applications. For example, the devices described in reference to FIGS. 8, 9, and 10 may be used in gyroscopy. The gyroscope applications are described in more detail in reference to FIGS. 13-17.

Figure 13:
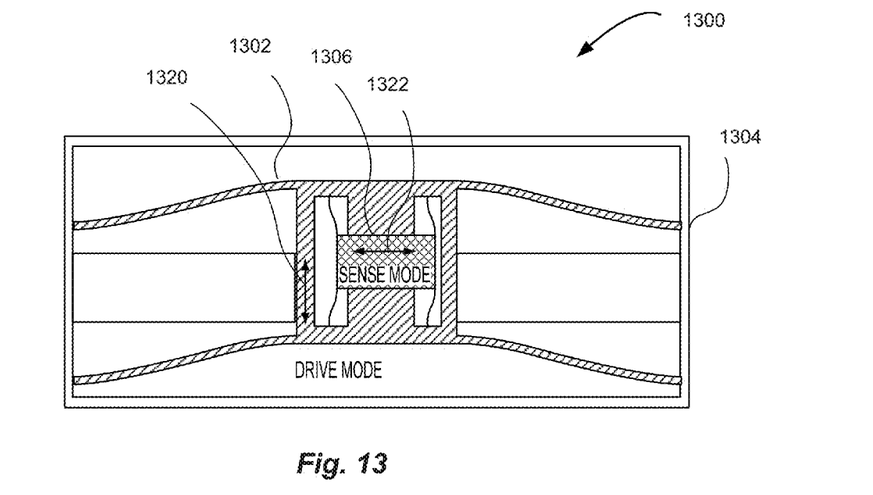
FIGS. 13-17 illustrate an example MEMS sensing device in different modes pertaining to a gyroscope, in accordance with some embodiments.
Figure 14:
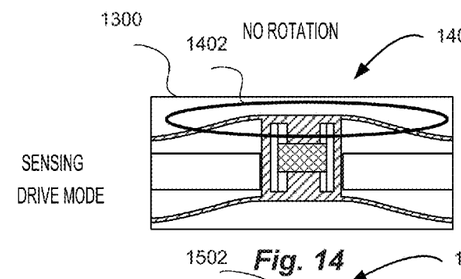
Figure 15:
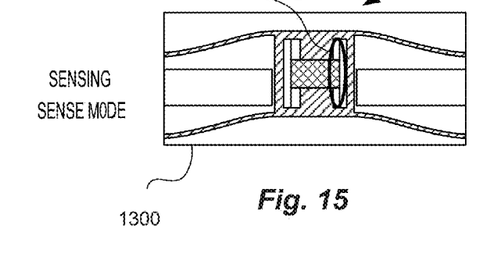
Figure 16:
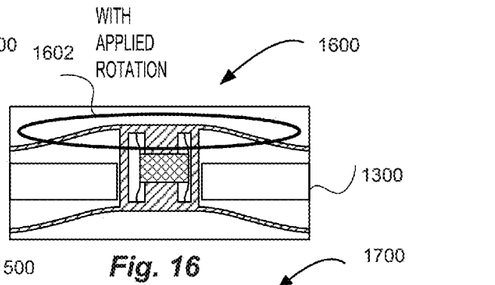
Figure 17:
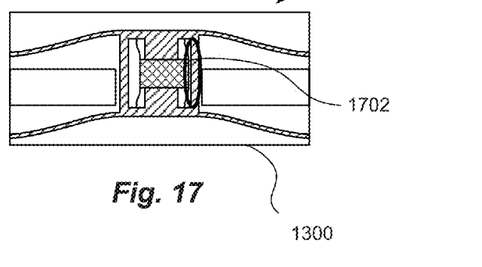

FIG. 13 is an example configuration of a MEMS sensing device 1300 such as a gyroscope, in accordance with some embodiments. The sensing device 1300 may include an outer proof mass 1302 affixed to a fixed frame 1304. The proof mass 1302 may be configured similar to one described in reference to FIGS. 8-10 and accordingly may include a sensing device similar to one described in reference to FIGS. 8-10 (not shown in FIG. 13 for simplicity). The proof mass 1302 may be configured to move in the direction indicated by arrow 1320 (drive mode).

The device 1300 may further include an inner proof mass 1306 (also configured similar to one described in reference to FIGS. 8-10 and including a similar sensing device that is not shown for simplicity) that is free to move in the direction indicated by arrow 1322 (sense mode), e.g., perpendicular to the drive mode. In some embodiments, the inner proof mass 1306 may be disposed within the outer proof mass 1302. In other embodiments, the inner and outer proof masses 1306 and 1302 may be disposed separately and affixed to the frame 1304. The outer proof mass 1302 may be excited at a determined drive frequency "ω drive," e.g., using a "drive" set of comb fingers (not shown for clarity), in order to provide for the Coriolis force (calculated to determine rotation speed) to be measurable.

FIGS. 14-17 illustrate an example MEMS sensing device 1300 in different modes pertaining to a gyroscope, specifically, configured to measure the gyroscope's sense and drive modes with or without applied external rotation, shown in states 1400, 1500, 1600, and 1700 configured as described in reference to FIG. 13. More specifically, device 1300 may be configured to sense the drive mode and sense mode without or with applied external rotation. For example, device 1300 may sense the drive mode and sense mode without applied external rotation in states 1400 and 1500 respectively and may sense the drive mode and sense mode with applied external rotation in states 1600 and 1700 respectively. An outer proof mass 1302 may be driven in the y-direction at frequency ω using electrostatic or other techniques, and when the gyroscope is subject to rotation about the z-axis to external rotation (the z-axis vector being in the direction out of plane of the page, so the rotation of the device occurring in plane with the page), an inner proof mass 1306 may deform in the x-direction at frequency $\omega_{sense}=\omega_{drive}$. The device 1300 may be configured to detect the motion of either the sense mode or the drive mode in states 1400, 1500, 1600, and 1700 at the locations of the black ellipses indicated by numerals 1402, 1502, 1602, and 1702 respectively. Note that the drive mode motion may also be sensed separately if desired.

Figure 18:
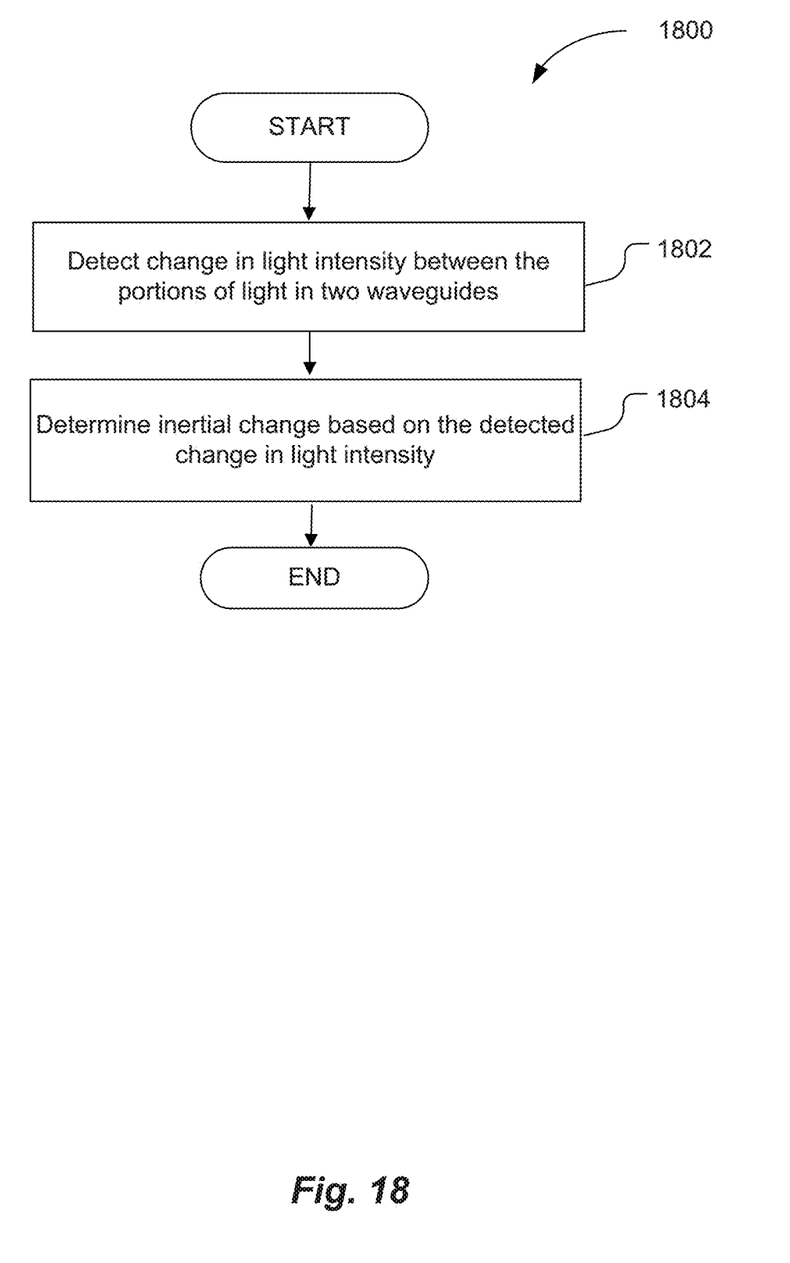
FIG. 18 schematically illustrates a flow diagram for a method of operating a MEMS sensing device, in accordance with some embodiments.

FIG. 18 is a process flow diagram illustrating operation of a MEMS sensing device, in accordance with some embodiments. The process 1800 may begin at block 1802, where a change in light intensity of light outputted by a waveguide of the sensing device may be detected. As described above, the device may be configured similar to the devices 100 or 200 100 or 200 as described in reference to FIGS. 1-17 and include an optical resonator comprising a deformable closed loop and optically coupled to the waveguide. As described above, a deformation of the optical resonator may be caused by an external acceleration applied to the apparatus, which may result in a change of an optical path length formed by the resonator, causing a corresponding change of the resonant frequency of the optical resonator. The change of resonant frequency results in a change in intensity of the transmitted light.

At block 1804, an inertial change (e.g., external acceleration) applied to the sensing device may be determined, based on the detected light intensity change, as described above. For example, the optical power of the transmitted light signal may vary with acceleration. The acceleration may be calculated based on that dependency as described above.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system or apparatus using any suitable hardware and/or software to configure as desired.

Figure 19:
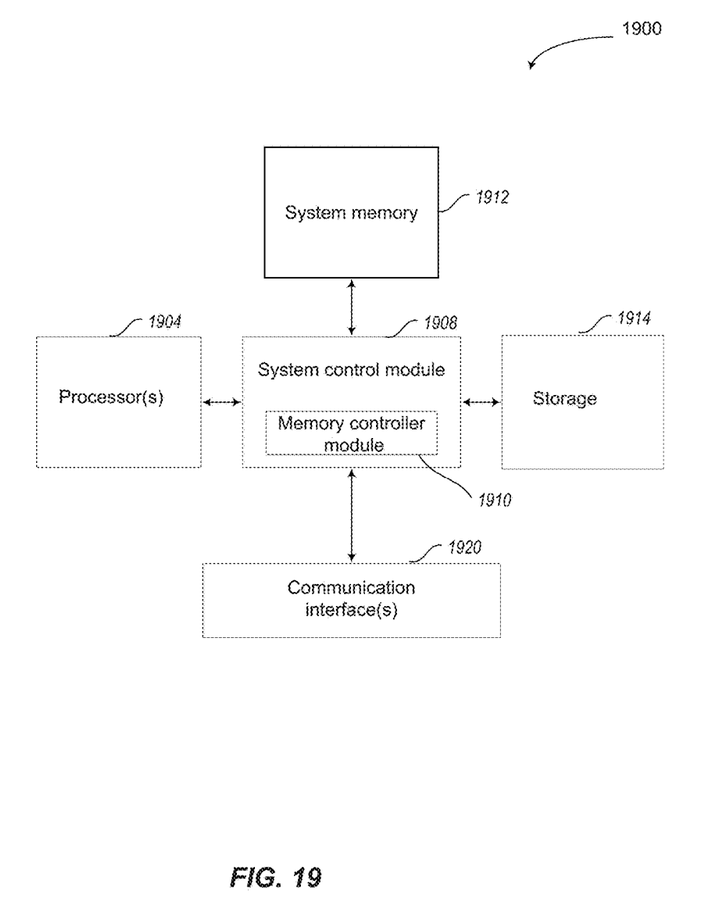
FIG. 19 schematically illustrates an example computing device including a MEMS sensing device, in accordance with some embodiments.

FIG. 19 schematically illustrates an example system that may be used to practice various embodiments described herein. FIG. 19 illustrates, for one embodiment, an example system 1900 having one or more processor(s) 1904, system control module 1908 coupled to at least one of the processor(s) 1904, system memory 1912 coupled to system control module 1908, non-volatile memory (NVM)/storage 1914 coupled to system control module 1908, and one or more communications interface(s) 1920 coupled to system control module 1908.

In some embodiments, the system 1900 may include a sensing device 100 or 200 and provide logic/module that performs functions aimed at detecting change of light intensity and calculating external acceleration and/or rotation applied to the system and/or other modules described herein. For example, the device 100 (200) may be disposed in a chip included in the system 1900. In some embodiments, the system 1900 may include one or more computer-readable media (e.g., system memory or NVM/storage 1914) having instructions and one or more processors (e.g., processor(s) 1904) coupled with the one or more computer-readable media and configured to execute the instructions to implement a module to perform light intensity change detection and inertial change calculation actions described herein.

System control module 1908 for one embodiment may include any suitable interface controllers to provide for any suitable interface to at least one of the processor(s) 1904 and/or to any suitable device or component in communication with system control module 1908.

System control module 1908 may include memory controller module 1910 to provide an interface to system memory 1912. The memory controller module 1910 may be a hardware module, a software module, and/or a firmware module. System memory 1912 may be used to load and store data and/or instructions, for example, for system 1900. System memory 1912 for one embodiment may include any suitable volatile memory, such as suitable DRAM, for example. System control module 1908 for one embodiment may include one or more input/output (I/O) controller(s) to provide an interface to NVM/storage 1914 and communications interface(s) 1920.

The NVM/storage 1914 may be used to store data and/or instructions, for example. NVM/storage 1914 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 1914 may include a storage resource physically part of a device on which the system 1900 is installed or it may be accessible by, but not necessarily a part of, the device. For example, the NVM/storage 1914 may be accessed over a network via the communications interface(s) 1920.

Communications interface(s) 1920 may provide an interface for system 1900 to communicate over one or more network(s) and/or with any other suitable device. The system 1900 may wirelessly communicate with the one or more components of the wireless network in accordance with any of one or more wireless network standards and/or protocols.

For one embodiment, at least one of the processor(s) 1904 may be packaged together with logic for one or more controller(s) of system control module 1908, e.g., memory controller module 1910. For one embodiment, at least one of the processor(s) 1904 may be packaged together with logic for one or more controllers of system control module 1908 to form a System in Package (SiP). For one embodiment, at least one of the processor(s) 1904 may be integrated on the same die with logic for one or more controller(s) of system control module 1908. For one embodiment, at least one of the processor(s) 1904 may be integrated on the same die with logic for one or more controller(s) of system control module 1908 to form a System on Chip (SoC).

In various embodiments, the system 1900 may have more or less components, and/or different architectures. For example, in some embodiments, the system 1900 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 1900 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 1900 may be any other electronic device.

The embodiments described herein may be further illustrated by the following examples. Example 1 is micro-electromechanical system (MEMS) apparatus, comprising: a laser arrangement configured to generate a light beam having a resonant wavelength; a waveguide configured to receive and output the light beam; and an optical resonator comprising a deformable closed loop and optically coupled to the waveguide to receive a portion of the light beam, wherein a deformation of the optical resonator results in a change of an optical path length of a portion of the light beam traveling through the optical resonator, causing a change in the resonant wavelength of the light beam outputted by the waveguide.

Example 2 may include the subject matter of Example 1, and further specifies that the change in the resonant wavelength corresponds to a detectable change in light intensity of the light beam outputted by the waveguide.

Example 3 may include the subject matter of Example 2, and further specifies that the apparatus further comprises a detector coupled to the waveguide and configured to detect the change in light intensity of the light beam outputted by the waveguide.

Example 4 may include the subject matter of Example 3, and further specifies that the apparatus further comprises circuitry coupled to the detector to determine an inertial change associated with the apparatus based on the detected change in light intensity.

Example 5 may include the subject matter of Example 4, and further specifies that the deformation of the optical resonator is caused by an external acceleration, which results in the inertial change.

Example 6 may include the subject matter of Example 5, and further specifies that the acceleration is applied in a direction substantially perpendicular to a plane of the apparatus.

Example 7 may include the subject matter of Example 1, and further specifies that the closed-loop optical resonator includes a ring having an axle disposed at a center of the ring and at least one spoke coupling the axle and a rim of the ring.

Example 8 may include the subject matter of Example 7, and further specifies that the apparatus further comprises a frame, wherein the closed-loop optical resonator is fixably attached to the frame with the axle.

Example 9 may include the subject matter of Example 8, and further specifies that the closed-loop optical resonator further includes a proof mass fixably attached to the rim around a coupling of the spoke with the rim.

Example 10 may include the subject matter of Example 9, and further specifies that the rim of the ring is configured to flex in response to an external acceleration applied to the frame in a direction substantially perpendicular to a plane of the frame.

Example 11 may include the subject matter of any of Examples 1 to 10, and further specifies that the apparatus includes a frame and a proof mass movably disposed inside the frame and further partially disposed about the proof mass, wherein moving the proof mass includes bending the proof mass out of plane of the frame or moving the proof mass in the plane of the frame.

Example 12 may include the subject matter of Example 11, and further specifies that the proof mass comprises an elongated shape having one end cantilevered to the inner side of the frame and wherein the optical resonator is disposed about the cantilevered end of the proof mass.

Example 13 may include the subject matter of Example 11, and further specifies that the proof mass comprises an elongated shape, wherein the proof mass is attached to the frame with one or more spring arrangement, and wherein the optical resonator is disposed about a side of the proof mass.

Example 14 may include the subject matter of Example 11, and further specifies that the closed-loop optical resonator comprises one of a substantially circumferential shape, a substantially serpentine shape, or a Mach-Zehnder interferometer.

Example 15 may include the subject matter of Example 11, and further specifies that bending or moving of the proof mass causes the deformation of the optical resonator, including stretching or compressing of the optical resonator, wherein the bending or moving of the proof mass is caused by an external acceleration applied to the frame.

Example 16 may include the subject matter of Example 11, and further specifies that the proof mass is cantilevered to the frame under an angle to curve away from a plane of the frame, wherein bending of the proof mass in one direction causes stretching of the optical resonator, and wherein bending of the proof mass in an opposite direction causes compression of the optical resonator, the stretching and compressing indicating a direction of an external acceleration applied to the frame that causes the bending of the proof mass.

Example 17 may include the subject matter of Example 1, and further specifies that the apparatus comprises an accelerometer or a gyroscope.

Example 18 may include the subject matter of Example 17, and further specifies that the apparatus is integrated in a chip.

Example 19 includes a method, comprising: detecting a change in light intensity of light outputted by a waveguide of a micro-electromechanical system (MEMS) apparatus that includes an optical resonator comprising a deformable closed loop and optically coupled to the waveguide; and determining an inertial change associated with the MEMS apparatus based on the detected change in light intensity, wherein the inertial change corresponds to an external acceleration applied to the MEMS apparatus.

Example 20 may include the subject matter of Example 19, and further specifies that the change in light intensity corresponds to a change of a resonant wavelength of the light outputted by the waveguide.

Example 21 may include the subject matter of Example 20, and further specifies that the change of a resonant wavelength is caused by a change of an optical path length of light traveling through the optical resonator due to a deformation of the optical resonator.

Example 22 may include the subject matter of Example 19, and further specifies that the MEMS apparatus comprises an accelerometer or gyroscope.

Example 23 may include the subject matter of Example 19, and further specifies that the apparatus includes a frame and a proof mass disposed inside the frame, wherein the proof mass comprises an elongated shape having one end cantilevered to the inner side of the frame.

Example 24 may include the subject matter of Example 19, and further specifies that the optical resonator is disposed about the cantilevered end of the proof mass, wherein the optical resonator comprises one of: a substantially circumferential shape, a substantially serpentine shape, or a Mach-Zehnder interferometer.

Example 25 may include the subject matter of any of Examples 19 to 24, and further specifies that the optical resonator includes a ring having an axle disposed at a center of the ring and at least one spoke coupling the axle and a rim of the ring wherein the closed-loop optical resonator is fixably attached to the frame with the axle.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A micro-electromechanical system (MEMS) apparatus, comprising:
    a laser arrangement configured to generate a light beam having a resonant wavelength;
    a waveguide configured to receive and output the light beam; and
    an optical resonator comprising a deformable closed loop and optically coupled to the waveguide to receive a portion of the light beam, wherein the deformable closed loop defines a radial plane in which the deformable closed loop is disposed,
    wherein the deformable closed loop is to deform in response to an application of inertial force to the deformable closed loop, substantially parallel to the radial plane of the deformable closed loop, wherein a deformation of the deformable closed loop occurs in the radial plane of the deformable loop and results in a change of a length of the deformable closed loop and corresponding change of an optical path length of a portion of the light beam traveling through the deformable closed loop, to cause a change in the resonant wavelength of the light beam outputted by the waveguide.

2. The apparatus of claim 1, wherein the change in the resonant wavelength corresponds to a detectable change in light intensity of the light beam outputted by the waveguide.

3. The apparatus of claim 2, further comprising a detector coupled to the waveguide and configured to detect the change in light intensity of the light beam outputted by the waveguide.

4. The apparatus of claim 3, further comprising circuitry coupled to the detector to determine an inertial change associated with the apparatus based on the detected change in light intensity.

5. The apparatus of claim 4, wherein the deformation of the deformable closed loop is caused by an external acceleration in response to the application of the inertial force.

6. The apparatus of claim 1, wherein the apparatus includes a frame and a proof mass movably disposed inside the frame and wherein the deformable closed loop is partially disposed about the proof mass, wherein movement of the proof mass includes movement of the proof mass in the plane of the frame.

7. The apparatus of claim 6, wherein the proof mass comprises an elongated shape having one end cantilevered to the inner side of the frame and wherein the deformable closed loop is disposed about the cantilevered end of the proof mass.

8. The apparatus of claim 6, wherein the proof mass comprises an elongated shape, wherein the proof mass is attached to the frame with one or more spring arrangement, and wherein the deformable closed loop is disposed about a side of the proof mass.

9. The apparatus of claim 6, wherein the deformable closed loop comprises one of a substantially circumferential shape, a substantially serpentine shape, or a Mach-Zehnder interferometer.

10. The apparatus of claim 6, wherein movement of the proof mass is to cause the deformation of the deformable closed loop, including stretch or compression of the deformable closed loop, wherein the bending or movement of the proof mass is caused by an external acceleration applied to the frame, in response to the application of the inertial force.

11. The apparatus of claim 6, wherein the proof mass is cantilevered to the frame to move in the plane of the frame, wherein movement of the proof mass in one direction causes stretching of the deformable closed loop, and wherein movement of the proof mass in an opposite direction causes compression of the deformable closed loop, the stretching and compressing indicating a direction of an external acceleration applied to the frame that causes the bending of the proof mass.

12. The apparatus of claim 1, wherein the apparatus comprises an accelerometer or a gyroscope.

13. The apparatus of claim 12, wherein the apparatus is integrated in a chip.

14. A method, comprising:
    detecting a change in light intensity of light outputted by a waveguide of a micro-electromechanical system (MEMS) apparatus that includes an optical resonator comprising a deformable closed loop and optically coupled to the waveguide, the deformable closed loop defining a radial plane in which the deformable closed loop is disposed, wherein the change in light intensity corresponds to a change of a resonant wavelength of the light outputted by the waveguide, wherein the change of a resonant wavelength is caused by a change of an optical path length of light traveling through the optical resonator in response to deforming the deformable closed loop in the radial plane of the deformable closed loop, as a result of applying inertial force to the deformable closed loop, substantially parallel to the radial plane of the deformable closed loop; and
    determining an inertial change associated with the MEMS apparatus based on the detected change in light intensity, wherein the inertial change corresponds to an external acceleration applied to the MEMS apparatus, wherein the external acceleration is caused by the inertial force.

15. The method of claim 14, wherein the MEMS apparatus comprises an accelerometer or gyroscope.

16. The method of claim 14, wherein the MEMS apparatus includes a frame and a proof mass disposed inside the frame, wherein the proof mass comprises an elongated shape having one end cantilevered to the inner side of the frame.

17. The method of claim 16, wherein the deformable closed loop is disposed about the cantilevered end of the proof mass, wherein the deformable closed loop comprises one of: a substantially circumferential shape, a substantially serpentine shape, or a Mach-Zehnder interferometer.

* * * * *